No. 696,781. Patented Apr. 1, 1902.
C. F. WILSON.
TROLLEY CATCHER AND RETRIEVER.
(Application filed Aug. 12, 1901.)
(No Model.) 2 Sheets—Sheet 1.
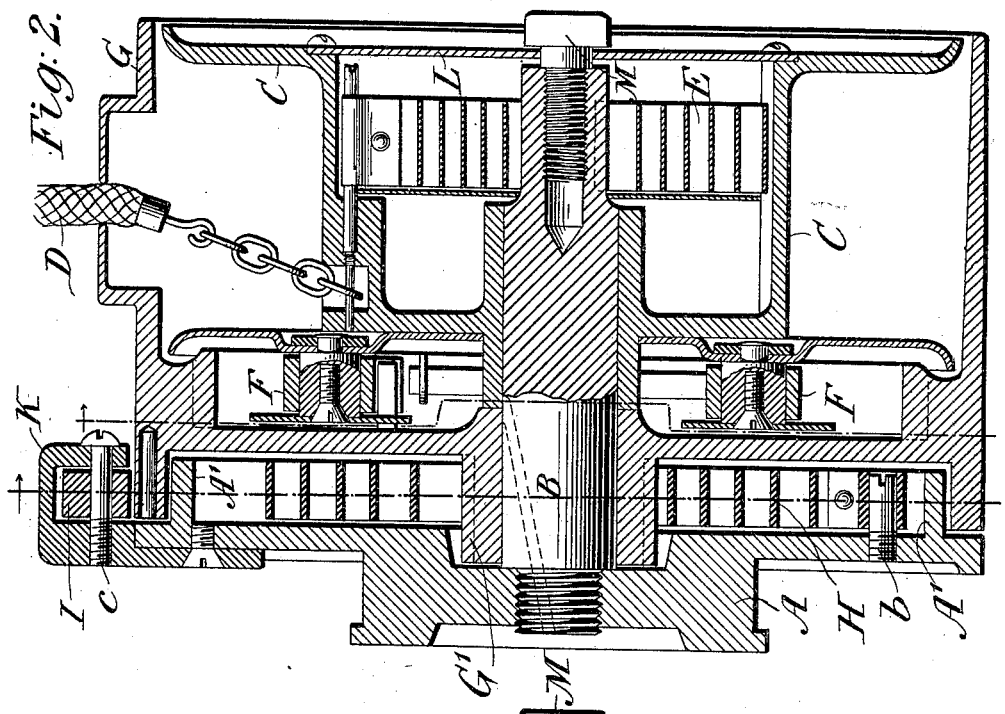
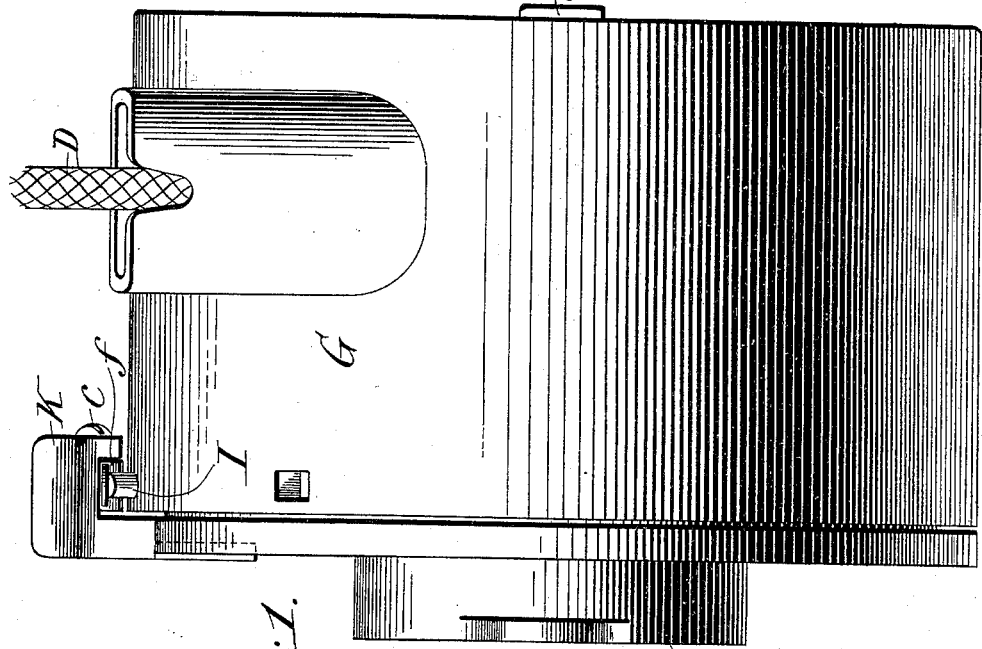
WITNESSES:
John A Rennie
L. A. Grote
INVENTOR
C. F. Wilson,
BY
Worth Osgood
ATTORNEY
THE NORRIS PETERS CO., PHOTO-LITHO., WASHINGTON, D. C.

No. 696,781. Patented Apr. 1, 1902.
C. F. WILSON.
TROLLEY CATCHER AND RETRIEVER.
(Application filed Aug. 12, 1901.)
(No Model.) 2 Sheets—Sheet 2.
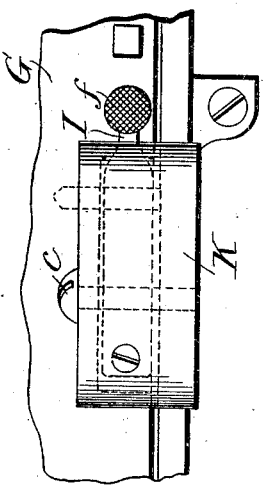
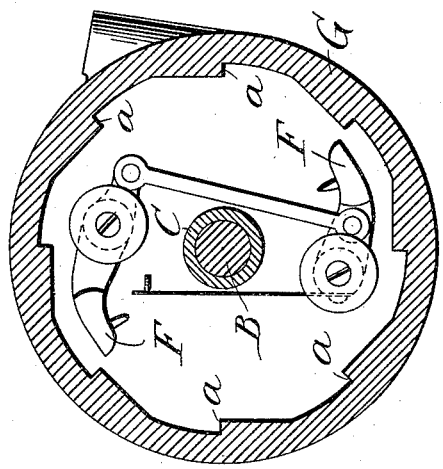
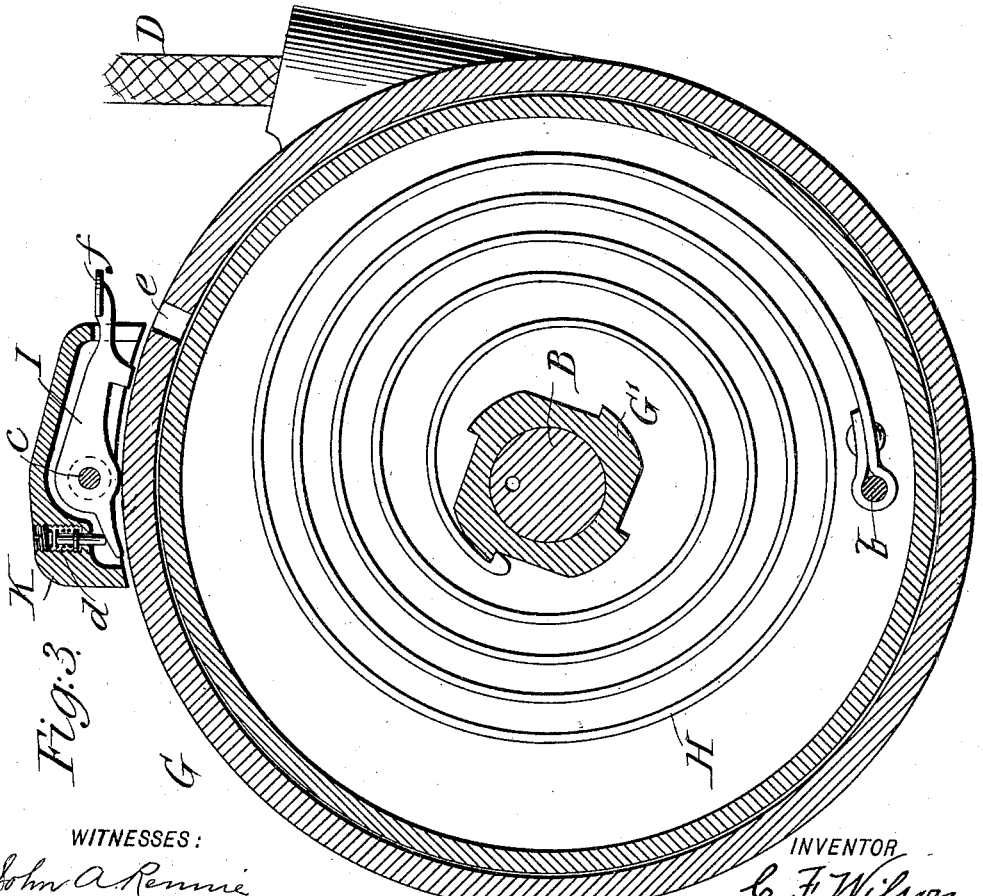
WITNESSES: INVENTOR

UNITED STATES PATENT OFFICE.

CHARLES F. WILSON, OF BROOKLYN, NEW YORK.

TROLLEY CATCHER AND RETRIEVER.

SPECIFICATION forming part of Letters Patent No. 696,781, dated April 1, 1902.

Application filed August 12, 1901. Serial No. 71,808. (No model.)

*To all whom it may concern:*

Be it known that I, CHARLES F. WILSON, a citizen of the United States, residing at the borough of Brooklyn, city of New York, county of Kings, and State of New York, have invented certain new and useful Improvements in Trolley Catchers and Retrievers, of which the following, in connection with the accompanying drawings, is a full, clear, and exact specification.

My invention relates to that class of devices intended to operate in connection with the trolley-rope for the purpose of automatically winding the same under certain conditions. Heretofore these devices have been arranged or adapted to catch or arrest the trolley-rope when the trolley by accident left the line above, or they have been arranged to wind up the trolley-rope after the trolley has been forced or carried far enough above the line to trip the winding mechanism, thereby pulling the trolley down.

The primary object of my present invention is to provide or produce a device which will operate to check any further rise of the trolley as soon as it leaves the line and which will operate also to wind up the trolley-rope, and thus draw the trolley down below the line.

Subordinate objects are to make the device of few and simple parts, easy and certain of operation, applicable in connection with any trolley-line or upon any car, so that the catching or checking device may be operated without calling into action the powerful winding device and so that the powerful winding device may be employed independently of the checking device, if so desired.

To accomplish all of the foregoing objects and to secure other and further advantages in the matters of construction, operation, and use, my improvements involve certain new and useful arrangements or combinations of parts and principles of operation, as will be herein first fully described and then pointed out in the claims.

In the accompanying drawings, forming part of this specification, Figure 1 is an exterior view or outside elevation of my improved device, the same being shown detached from the car. Fig. 2 is an axial section and elevation of the same, showing the interior parts constructed and arranged for operation in accordance with my invention and involving my improvements. Fig. 3 is a cross-section and elevation on planes through the broken line $x\,x$ of Fig. 2, showing the main winding-spring and the drum-holding dog, the casing or drum being slightly turned from the position it occupies in Fig. 2. Fig. 4 is a plan showing fragments of the back and of the winding-drum and illustrating the arrangement and location of the holding-dog corresponding with Fig. 3. Fig. 5 is a cross-section and partial elevation through the drum, on a scale smaller than previous figures, and illustrating the general arrangement and location of the catching or locking dogs by which the spool is arrested.

In all the figures like letters of reference wherever they occur indicate corresponding parts.

A is the back-piece of the machine, made sufficiently strong for the purpose intended and calculated to be fixed upon any convenient point of the car and by any suitable means, preferably so that it may be detached whenever necessary, as is customary in devices which operate upon the trolley-rope.

B is a central stud operating as an axle for the spool and drum, the same being fixed with respect to the back-plate in any substantial manner. By preference I thread it into the back-plate, as indicated in Fig. 2, and then rivet it securely in place.

C is a spool on which the trolley-rope D is wound. This spool is journaled on the axle B and is automatically controlled by a spring E. This spring E is calculated to wind the spool C, so as to keep the trolley-rope taut, but not with sufficient power to draw the trolley down off the trolley-line. Connected with this spool and so as to revolve therewith around the axle are two dogs F F, the same being pivoted and connected substantially as shown in Fig. 5, their outer ends being slightly weighted, if necessary, and the whole arrangement being such that when the spool C is turned rapidly enough the outer ends of the dogs F will by centrifugal force be thrown farther from the center. If the trolley rises slowly, the trolley-rope turns the spool and winds the spool-spring, and as the trolley is gradually lowered, as by reason of the height of the linewire, the spring slowly turns the spool and winds up the trolley-rope, thus always keeping a light strain on the rope or enough to keep it taut.

When the trolley leaves or "jumps" the linewire, a sudden turn is given the spool through the trolley-rope, and this causes the dogs to swing out and engage or lock with the casing, instantly arresting the further turning of the spool, and consequently preventing any further rise of the trolley.

The casing is supplied with suitable stops, as $a$ $a$, against which the dogs are arrested as soon as they swing outward under the rapid movement of the spool. The arresting of the further upward movement is called "catching" the trolley and devices for effecting the result are called "trolley-catchers."

The device so far explained is substantially such as is described and claimed in the patent granted to me January 11, 1898, No. 597,159, and of course is not intended to be specifically claimed herein.

In the patent above named the casing within which the spool is located is made fast to the back, because it is not expected to turn, and the patented device is not intended to draw the trolley down below the trolley-line. In my present invention, however, I mount the casing for the spool so that it shall turn with respect to the back, and I utilize this casing as a drum on which the trolley-rope may be wound, so as to draw the trolley down. Other devices have heretofore been made for drawing the trolley down. These are called "trolley-retrievers." They do something more than merely arrest the upward movement of the trolley after it leaves the line.

G is the casing, which I use for a winding-drum. It is supplied with a hub G', which for convenience I make to turn upon the axle B, the same axle which sustains the spool. To accommodate this hub and make it long enough to afford the desired bearing without unnecessarily increasing the length of the machine, I recess the inner side of the back-plate A, as indicated in Fig. 2, so as to accommodate a portion of this hub; but other means of mounting the casing so that it will turn may be employed, if desired, and the back-plate may be plain instead of being recessed, if preferred.

In the construction shown the back-plate A is provided also with a flange A', extending a little way into the drum, affording a convenient compartment within which to locate the drum-actuating spring.

H is the drum-actuating spring, which is very much stronger than the spring E and of ample power to wind the drum, so as to insure the pulling down of the trolley whenever the spring is brought into action. This spring H is fixed at one end upon the stationary back A, as by a stud $b$, and at the other end it engages with the hub G' of the drum G or with some other part of said drum, so that when the spring is wound and the drum free to move it will be turned by the action of the spring. One means of making this connection is indicated in Fig. 3, wherein the inner end of the spring engages with ledges formed on the hub G'. This enables the hub to be connected with the spring at any desired position of the hub in order after the device has been affixed to the car the drum may be turned so that the trolley-rope will lead out of it fairly and so that the spring is in position to be wound up whenever required. To effect the winding up of this spring H, it is only necessary to take two or three turns of the trolley-rope around the drum G and then pull on the free end of the rope. This will effect the turning of the drum, and consequently the winding of the spring. In this manner the spring may be wound up to any desired degree of tension. Of course the farther it is wound up the farther down it will pull the trolley when it is allowed to act. It might be wound by other means or in other ways, if preferred.

To hold the drum and the spring H in wound-up position, I employ a dog, as I. This is sustained in a suitable frame or support K, affixed to the back of the machine, and it is pivoted in the frame, as on a pivot-pin $c$, or in any other suitable way, and it is held normally out of engagement with the drum, as by a spring $d$, which through a suitable pin bears down upon an arm of the dog projecting back of the pivot-pin $c$. The casing or drum G is suitably notched, as at $e$, at one or more points or otherwise suitably fashioned to permit engagement therewith of the dog I when the notch or recess is brought to the proper position. After winding the drum-spring as above explained, either by use of the trolley-rope or by other means of turning it, the dog is pushed down into engagement with the drum and against the action of the spring $d$. For this purpose the dog is supplied with a convenient thumb-piece $f$. Being in engagement with the drum, the dog holds the spring H from unwinding, and the strain of the drum upon the dog prevents its disengagement until that strain is released.

With the machine constructed and arranged as so far explained it is plain that whenever the trolley leaves the trolley-line its quick upward movement tends to turn the spool C very rapidly, and at that instant the dogs F fly out and engage the outer drum, the force of the jerk being thus transmitted to the outer drum. This operates to turn the outer drum back very slightly against the action of the spring H, and this is sufficient to release the dog I, so that then the spring H effects the rotation of the drum, and thereby the winding up of the trolley-rope, and thus the pulling down of the trolley. It is in this way that the trolley is "retrieved."

The catcher will operate the same as in my above-named patent even though the winding-drum be not called into action, the drum then merely operating as the casing which contains the spool. The drum may be employed without utilizing the catcher-spool, if so desired.

L is merely a plate for closing the spring-cavity in the spool and turning about the securing screw-pin M, which enters the axle B; but these details are not essential to my invention.

The improved device is simple of construction and arrangement, not liable to get out of order, and it will be found to admirably answer all the purposes or objects of the invention hereinbefore alluded to. It is but a trifle larger than the catcher heretofore employed, and the utilization of the catcher-casing for the winding-drum enables me to make the device of length only a very little greater than that of the catcher alone.

Having now fully described my invention, what I claim as new herein, and desire to secure by Letters Patent, is—

1. In a device of the character herein set forth, the combination with a spool carrying dogs, of an outer casing arranged to turn with respect to the back-plate, the same being supplied with an operating-spring and calculated to wind the trolley-rope upon its exterior, substantially as and for the purpose set forth.

2. In combination with the revolving drum and its operating-spring, a dog for holding said drum against the action of the spring, and means substantially as described for releasing said dog by turning the drum against the action of the spring, substantially in the manner and for the purpose set forth.

3. In a device of the character herein set forth, the combination of a spool carrying dogs, a revolving casing or drum outside said spool, and a stationary back, the spool and drum being mounted upon and arranged to turn upon the same axle, substantially as shown and for the purpose set forth.

4. In a device of the character herein set forth, the combination with the spring-actuated exterior drum and the stationary back, of a dog for holding said drum against the action of its actuating-spring, said dog being supported upon the back and held normally free from engagement with the drum, substantially in the manner and for the purpose set forth.

5. In a device of the character herein set forth, the combination of the spool, the dogs carried by said spool, a revolving casing for the spool, a stationary back, and a dog for engagement with the drum, the drum being actuated by a spring and being mounted upon the same axis as the inner spool, substantially as shown and described.

In testimony whereof I have signed my name to this specification in the presence of two subscribing witnesses.

CHARLES F. WILSON.

Witnesses:
C. SEDGWICK,
WORTH OSGOOD.